United States Patent
Zelesky

(10) Patent No.: US 11,359,503 B2
(45) Date of Patent: Jun. 14, 2022

(54) ENGINE WITH COOLING PASSAGE CIRCUIT EXTENDING THROUGH BLADE, SEAL, AND CERAMIC VANE

(71) Applicant: United Technologies Corporation, Farmington, CT (US)

(72) Inventor: Mark F. Zelesky, Bolton, CT (US)

(73) Assignee: AYTHEON TECHNOLOGIES CORPORATION, Farmington, CT (US)

(*) Notice: Subject to any disclaimer, the term of this patent is extended or adjusted under 35 U.S.C. 154(b) by 178 days.

(21) Appl. No.: 16/592,916

(22) Filed: Oct. 4, 2019

(65) Prior Publication Data
US 2021/0102494 A1 Apr. 8, 2021

(51) Int. Cl.
| | | |
|---|---|---|
| F01D 9/06 | (2006.01) | |
| F01D 5/08 | (2006.01) | |
| F01D 5/18 | (2006.01) | |
| F01D 11/00 | (2006.01) | |

(52) U.S. Cl.
CPC ............ *F01D 9/065* (2013.01); *F01D 5/081* (2013.01); *F01D 5/187* (2013.01); *F01D 11/001* (2013.01); *F05D 2220/32* (2013.01); *F05D 2240/12* (2013.01); *F05D 2240/24* (2013.01); *F05D 2260/205* (2013.01); *F05D 2260/221* (2013.01); *F05D 2260/941* (2013.01)

(58) Field of Classification Search
CPC ... F01D 9/065; F01D 11/001; F05D 2260/205
See application file for complete search history.

(56) References Cited

U.S. PATENT DOCUMENTS

| | | | |
|---|---|---|---|
| 3,291,447 A | 12/1966 | Brandon | |
| 5,758,487 A | 6/1998 | Salt et al. | |
| 6,250,061 B1 * | 6/2001 | Orlando | F02C 3/13 60/772 |
| 7,648,340 B2 * | 1/2010 | Sadler | F01D 5/141 416/223 A |
| 10,590,786 B2 * | 3/2020 | Bunker | F01D 25/24 |
| 2007/0295011 A1 | 12/2007 | Suciu et al. | |
| 2016/0290157 A1 | 10/2016 | Ning et al. | |
| 2018/0135460 A1 | 5/2018 | Barker et al. | |

FOREIGN PATENT DOCUMENTS

| | | | |
|---|---|---|---|
| EP | 1033484 | 9/2000 | |
| WO | WO-9615356 A1 * | 5/1996 | ............ F01D 9/02 |
| WO | 2013130172 | 9/2013 | |

OTHER PUBLICATIONS

European Search Report for European Patent Application No. 20199616.2 completed Feb. 23, 2021.

* cited by examiner

*Primary Examiner* — Ninh H. Nguyen
*Assistant Examiner* — John S Hunter, Jr.
(74) *Attorney, Agent, or Firm* — Carlson, Gaskey & Olds, P.C.

(57) ABSTRACT

A gas turbine engine includes a rotor carrying a blade, a ceramic vane adjacent the blade, a seal carried on the rotor adjacent the tip of the ceramic vane, and a cooling passage circuit extending through the blade, the seal, and the ceramic vane. The cooling passage circuit is configured to provide cooling air into the blade, then from the blade into the seal, and then from the seal into the ceramic vane.

18 Claims, 4 Drawing Sheets

ENGINE WITH COOLING PASSAGE CIRCUIT EXTENDING THROUGH BLADE, SEAL, AND CERAMIC VANE

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Airfoils in the turbine section are typically formed of a superalloy and may include thermal barrier coatings to extend temperature resistance. Ceramic matrix composite ("CMC") materials are also being considered for airfoils. Among other attractive properties, CMCs have high temperature resistance and oxidation resistance. Despite these attributes, however, there are unique challenges to implementing CMCs in airfoils.

SUMMARY

A gas turbine engine according to an example of the present disclosure includes a rotor carrying a blade, a ceramic vane adjacent the blade, and a seal carried on the rotor adjacent the tip of the ceramic vane. A cooling passage circuit extends through the blade, the seal, and the ceramic vane. The cooling passage circuit is configured to provide cooling air into the blade, then from the blade into the seal, and then from the seal into the ceramic vane.

In a further embodiment of any of the foregoing embodiments, the cooling passage circuit includes a circuit leg in the blade. The circuit leg has a supply passage into the blade and a return passage connecting the supply passage with the seal.

In a further embodiment of any of the foregoing embodiments, the cooling passage circuit includes a circuit leg in the seal. The circuit leg has an axial passage connected to receive cooling air from the blade, and a radial feed passage connecting the axial passage with the ceramic vane.

In a further embodiment of any of the foregoing embodiments, the cooling passage circuit includes first and second circuit legs. The first circuit leg is in the blade and has a supply passage into the blade and a return passage connecting the supply passage with the seal, and the second circuit leg is in the seal and has an axial passage connected to receive cooling air from the return passage, and a radial feed passage connecting the axial passage with the ceramic vane.

In a further embodiment of any of the foregoing embodiments, the seal is formed of ceramic.

In a further embodiment of any of the foregoing embodiments, the rotor includes a disk and an axial support arm projecting from the disk and supporting the seal.

In a further embodiment of any of the foregoing embodiments, the rotor includes a disk supporting the seal.

In a further embodiment of any of the foregoing embodiments, the cooling passage circuit includes a radial inlet in the tip of the ceramic vane and a radial outlet in the seal which is in register with the radial inlet.

In a further embodiment of any of the foregoing embodiments, the blade includes a compliant seal element sealing a supply passage into the blade from a return passage that connects the supply passage with the seal.

A gas turbine engine according to an example of the present disclosure includes a forward stage that has a row of forward vanes followed by a row of forward blades. An aft stage has a row of aft ceramic vanes followed by a row of aft blades. There are seals adjacent the tips of the aft ceramic vanes. A cooling passage circuit extends through the forward blades, the seals, and the aft ceramic vanes.

In a further embodiment of any of the foregoing embodiments, the forward stage is a first turbine stage and the aft stage is a second turbine stage.

The gas turbine engine as recited in claim 10, further comprising a cooling air source radially inwards of the forward blades.

In a further embodiment of any of the foregoing embodiments, the cooling passage circuit is configured to provide cooling air into the forward blades, then from the forward blades into the seals, and then from the seals into the aft ceramic vanes.

In a further embodiment of any of the foregoing embodiments, the cooling passage circuit includes a circuit leg in the forward blades. The circuit leg has supply passages into the forward blades and return passages connecting the supply passages with the seals.

In a further embodiment of any of the foregoing embodiments, the cooling passage circuit includes a circuit leg in the seals. The circuit leg has axial passages connected to receive cooling air from the forward blades, and radial feed passages connecting the axial passages with the aft ceramic vanes.

In a further embodiment of any of the foregoing embodiments, the cooling passage circuit includes first and second circuit legs. The first circuit leg is in the forward blades and has supply passages into the forward blades and return passages connecting the supply passages with the seals, and the second circuit leg is in the seals and has axial passages connected to receive cooling air from the return passages, and radial feed passages connecting the axial passages with the aft ceramic vanes.

In a further embodiment of any of the foregoing embodiments, the seals are formed of ceramic.

In a further embodiment of any of the foregoing embodiments, the cooling passage circuit includes radial inlets in the tips of the aft ceramic vanes and radial outlets in the seals which are in register with the radial inlets.

A method for cooling a ceramic vane according to an example of the present disclosure includes routing cooling air through a blade. The blade heats the cooling air to provide pre-heated cooling air. The pre-heated cooling air is then routed from the blade into a seal adjacent a tip of a ceramic vane, and then from the seal into the ceramic vane.

In a further embodiment of any of the foregoing embodiments, the pre-heated cooling air maintains at least a portion of the ceramic vane at a thermal gradient of 150° C. or less.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
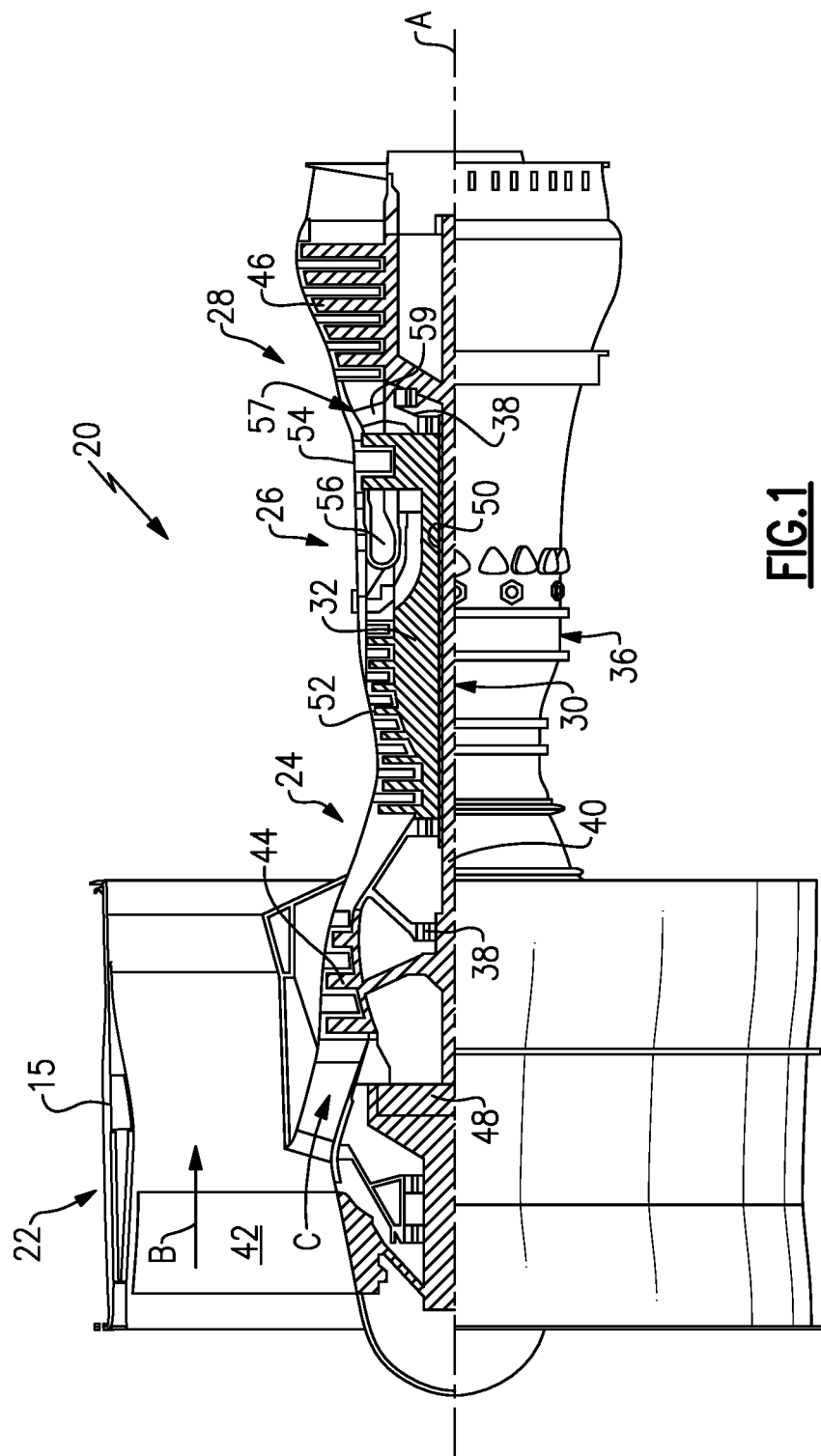
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram° R)/(518.7° R)]^0.5. The "Low corrected fan tip speed" as disclosed herein according to one non-limiting embodiment is less than about 1150 ft/second (350.5 meters/second).

Figure 2:
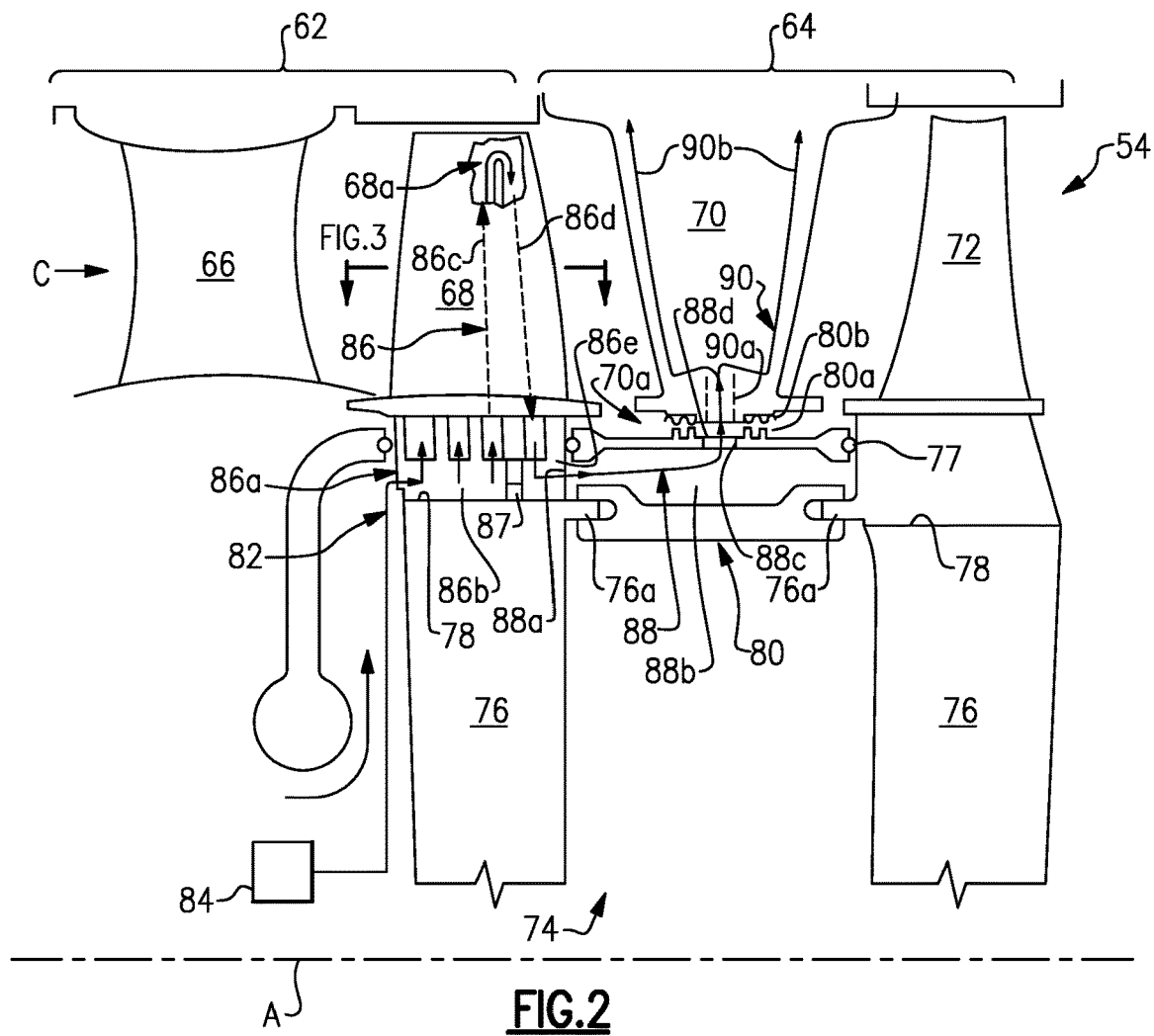
FIG. 2 illustrates a portion of a turbine section of the engine.

FIG. 2 illustrates a portion of the high pressure turbine 54. The turbine 54 includes a first or forward stage 62 and a second or aft stage 64. A "stage" is comprised of one row of static vanes followed by one row of rotatable blades. Here, the forward stage 62 includes a row of forward vanes 66 followed by a row of forward blades 68, and the aft stage 64 includes a row of aft vanes 70 followed by a row of aft blades 72. In this example, "first" or "forward" indicates that the stage 62 is upstream of the stage 64 with regard to the flow of gases through the core gas path C. The first stage 62 may also be the initial stage of the high pressure turbine 54, immediately after the combustor 56. It is to be understood, however, that although the stages 62/64 may be shown or described herein with reference to the high pressure turbine 54, the examples herein are applicable to other, downstream stages as well as stages in the low pressure turbine 46.

The blades 68/72 are carried on a rotor 74, which may include rotor disks 76. For example, the rotor disks 76 include axial slots 78 in which roots of the respective blades 68/72 fit to secure the blades 68/72. The rotor 74 additionally carries seals 80 axially between the rotor disks 76. The seals 80 are located adjacent tips 70a of the vanes 70. The seals 80 serve as a gas seal around the vane inner diameter below platform region 70a of the vanes 70. The seals 80 may include one or more seal elements 80a that cooperate with associated seal elements 80b on the vanes 70 to provide sealing. As shown, the seal elements 80a are knife edges and the seal elements 80b are abradable elements, such as honeycomb elements. The seals 80, however, are not particularly limited to knife edge seals and may instead employ other types of seals, such as but not limited to, non-contacting hydrodynamic seals.

At least the vanes 70 of the second stage 64 are formed of ceramic. The seals 80 may also be formed of ceramic, for weight savings. The ceramic may be a monolithic ceramic or a ceramic matrix composite ("CMC"). Example ceramic material may include, but is not limited to, silicon-containing ceramics. The silicon-containing ceramic may be, but is not limited to, silicon carbide (SiC) or silicon nitride ($Si_3N_4$). An example CMC may be a SiC/SiC CMC in which SiC fibers are disposed within a SiC matrix. As used herein, "formed of" refers to the structural self-supporting body of the component, rather than a conformal body such as a coating.

In general, vanes that are formed of ceramic present thermal management challenges that are unlike metallic vanes. Metallic alloys used for vanes have relatively high strength and ductility. Thus, although metallic vanes are often cooled, the ductility enables the metallic vanes with withstand high thermal gradients between exterior surfaces in the core gas path and interior surfaces that are cooled. Ceramic materials have relatively higher thermal resistance, but lower thermal conductivity and lower ductility in comparison to metallic materials. As a result, cooling a ceramic vane may actually be detrimental to durability because high thermal gradients may cause thermal stresses that exceed the limits of the ceramic. In this regard, the engine 20 includes a cooling passage circuit, represented at 82, that serves to pre-heat cooling air before the cooling air is provided into the vanes 70. The pre-heated cooling air provides a cooling effect in the vanes 70 but, due to the pre-heating, enables the vane 70 to maintain lower thermal gradients in comparison to non-pre-heated cooling.

The cooling passage circuit 82 is connected to receive cooling air from a cooling air source 84. The cooling air source 84 is generally radially inwards of the blades 68 and may be, but is not limited to, a tangential onboard injector.

Figure 3:
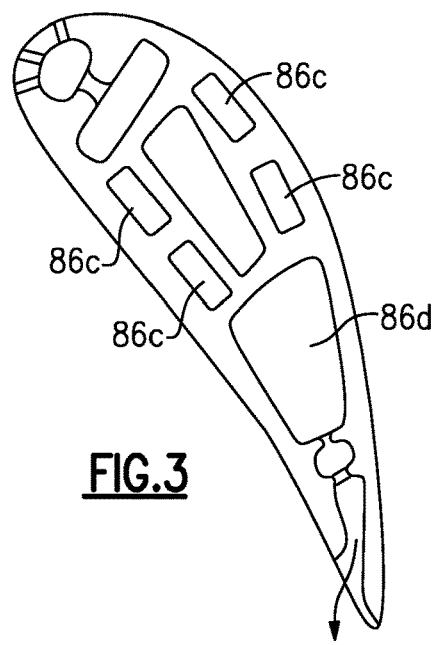
FIG. 3 illustrates a sectioned view of a blade.

The cooling passage circuit 82 is comprised of a network of interconnected passages among the blades 68, seals 80, and vanes 70. The cooling passage circuit 82 includes several circuit legs, or sections. A first, or initial, circuit leg 86 of the cooling passage circuit 82 is in the blades 68 and includes an inlet 86a, a manifold passage 86b, one or more supply passages 86c, and one or more return passages 86d. The inlet 86a is an entrance to the manifold passage 86. For example, the inlet 86a may be in the root section of the blade 68. The manifold passage 86b is a generally axially-oriented passage in the root. The supply passage or passages 86c extend off of the manifold passage 86b into the airfoil section of the blade 68. As shown in the sectioned view of the blade 68 in FIG. 3, the blade 68 may have multiple supply passages 86c, which may include but are not limited to one or more of a central cavity, leading end cavity, or skincore passages within walls of the blade 68.

The supply passage or passages 86c connect to the return passage or passages 86d. For example, as shown in FIG. 2, the blade 68 may include one or more turn sections 68a that serve to turn the flow of cooling air from one or more supply passages 86c into one or more return passages 86d. The turn section 68a may be part of a serpentine configuration of the supply passages 86c, for example.

Figure 4A:
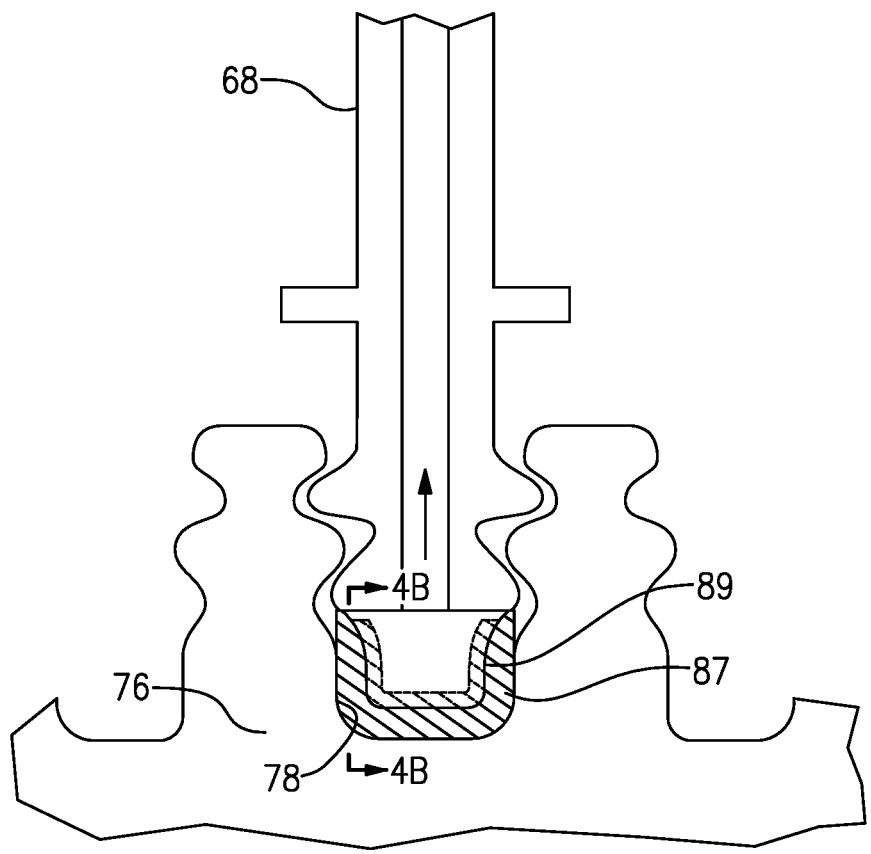
FIG. 4A illustrates an axial view of a seal in the blade.
Figure 4B:
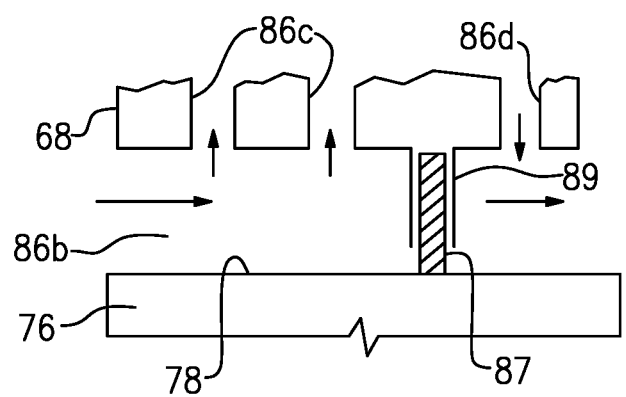
FIG. 4B illustrates a sectioned view of the blade of FIG. 4A.

The return passage or passages 86d connect the supply passage or passages 86c to the seal 80. For example, the return passage or passages 86d extend radially from the airfoil section of the blade 68 into the root of the blade 68 and then extend axially in the root to an outlet 86e at the aft side of the blade 68 near the seal 80. The axial extent of the return passage 86d leading to the outlet 86e may be an extension of the manifold passage 86b that is sealed off from the remaining portion of the manifold passage 86b that connects to the supply passages 86c. For instance, a passage seal 87 may be disposed in the manifold passage 86b to isolate the supply side from the return side. FIG. 4A illustrates an axial view of one example of the passage seal 87 disposed in the slot 78, and FIG. 4B illustrates a sectioned view according to the section line shown in FIG. 4A. As an example the seal 87 is compressible and is disposed in a post or rib 89 that projects from the root of the blade 68. The seal abuts the floor and sides of the slot 78 to thereby divide the manifold passage 86b so that incoming and exiting cooling air in the manifold passage 86b do not readily mix.

The seals 80 are mounted immediately adjacent the blades 68. In the illustrated example, the seals 80 are supported on an axial supports 76a. Edge seals 77 may be provided at the fore and aft locations of the seal 80, to facilitate limiting of cooling air between the seal 80 and the blade 68. The edge seals 77 may be, but are not limited to, wire seals.

A second circuit leg or section 88 of the cooling passage circuit 82 is in the seals 80. The second circuit section 88 includes an inlet 88a, an axial passage 88b, and a radial feed passage 88c. The inlet 88a is an entrance to the axial passage 88b. The inlet 88a is in register with the outlet 86e of the return passage or passages 86d, to receive cooling air therefrom. The axial passage 88b extends axially through the seal 80 and connects the inlet 88a with the radial feed passage 88c. The radial feed passage 88c extends radially to a radial outlet 88d adjacent the vane inner diameter below platform region 70a of the vane 70. In this example, the radial outlet 88d is axially between knife edges 80a.

Referring to FIG. 2, a third circuit leg or section 90 of the cooling passage circuit 82 is in the vanes 70. The third circuit section 90 includes a radial inlet 90a and one or more cooling passages 90b. The radial inlet 90a is an entrance to the cooling passage or passages 90b. The radial inlet 90a is in register with the radial outlet 88d of the seal 80.

When the engine 20 is in operation, the cooling air source 84 provides cooling air to the cooling passage circuit 82. The cooling air is initially provided through the inlet 86a and into the manifold passage 86b. The cooling air then flows from the manifold passage 86b into the one or more supply passages 86c. The cooling air in the supply passages 86c picks up heat from the walls of the blade 68, thereby substantially increasing in temperature. The cooling air then flows into the return passage or passages 86d, picking up additional heat, before being discharged from the outlet 86e to the inlet 88a of the seal 80.

The temperature increase of the cooling air from the inlet 86a to the outlet 86e may vary depending on the stage location and starting temperature of the cooling air. However, in one example in which the stage 62 is the initial stage of the high pressure turbine 54, the cooling air starting temperature is TOBI exit temperature 84, this is a function of compressor exit temperature and any cooling or heating in the air delivery circuit prior to 86a. The cooling air picks up heat from the inner walls of the turbine blade and thus may be pre-heated to increase in temperature by an amount of 50° C. to 400° C.

The pre-heated cooling air is then received through the inlet 88a of the seal 80 into the axial passage 88b. The pre-heated cooling air then flows axially along the axial passage 88b to the radial feed passage 88c. The pre-heated cooling air may pick up additional heat from windage in the seal 80 as the seal 80 rotates with the rotor 74. The radial feed passage 88c discharges the pre-heated cooling air radially through the radial outlet 88d. As the radial outlet 88d is in register with the radial inlet 90a of the vanes 70, the pre-heated cooling air is received into the vanes 70, where it then flows through the cooling passage or passages 90b to cool the vane 70. The location of the outlet 88d and inlet 90a at the seal elements 80a/80b may also facilitate cooling air flow between the rotating seal 80 and the stationary vane 70, as this region is sealed from the gas flow in the core gas path C and thus shields the cooling air from being stripped away.

By first flowing through the blade 68 to be pre-heated, the cooling air received into the vane 70 is warmer than it otherwise would have been if received directly from the cooling air source 84. For instance, based on the example above, the pre-heated cooling air is warmer by 50° C. to 400° C. The relatively warmer pre-heated cooling air maintains at least a portion of the vane 70 at a desired thermal gradient. For instance, if cooling air were used directly from the cooling air source 84, the internal surfaces of the vane 70 would be cooled to a greater degree, thereby creating relatively large thermal gradient with exterior surfaces of the vane 70. Wall or rib through-thickness thermal gradients can thus exceed temperature differentials of 400° C. or more. However, the pre-heated cooling air cools the internal surfaces of the vane 70 to a lesser degree, thereby enabling lower thermal gradients. As an example, wall or rib through-thickness thermal gradients may be maintained at a temperature differential of 150° C. or less.

The approach of using cooling air in a ceramic vane that is pre-heated in a blade is contrary to paradigms used in metallic vanes, where maximized cooling is typically desired. For the ceramic vanes as disclosed herein, maximized cooling would be likely to debit durability. Instead, the vanes 70 are cooled to a lesser degree than is possible. This enables reductions in thermal gradient temperature differentials between exterior and interior surfaces, which in turn facilitates reductions in thermal stresses to increase durability. Moreover, the use of the same cooling air in the blades 68 and vanes 70 may facilitate reductions in the amount of air used in comparison to using separate dedicated cooling streams to the blades and to the vanes.

Figures 5A, 5B:
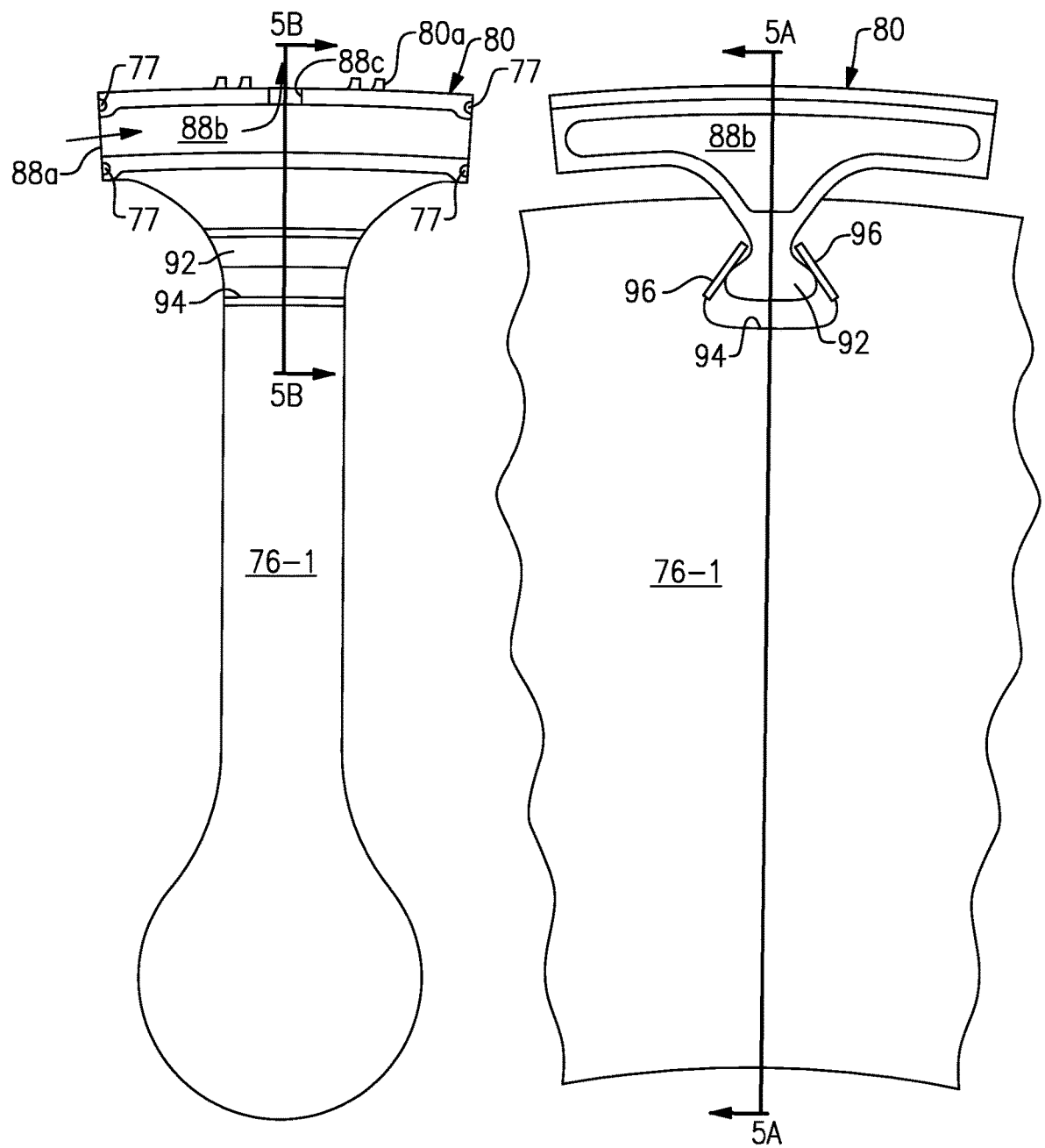
FIG. 5A illustrates a view of a seal supported on a minidisk.
FIG. 5B illustrates a sectioned view of the seal and minidisk of FIG. 5A.

In one alternate example shown in FIGS. 5A and 5B, rather than the supports 76a, the seals 80 are supported on an additional disk 76-1, e.g., a "minidisk," located would be between the rotor disks 76 in FIG. 2. For instance, the disk 76-1 may be referred to as a "minidisk." In this example, the seal 80 has a root 92 that interlocks with a slot 94 in the disk 76-1. A pad or pads 96 may be provided between the sides of the root 92 and the sides of the slot 94, to facilitate a reduction in wear and limit direct contact between the ceramic of the seal 80 and the superalloy, such as a nickel-based alloy, that the disk 76-1 is formed of. Additionally, in any of the examples herein, there may be one seal 80 per blade 68, or two or more seals 80 per blade 68.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:
   a rotor carrying a blade;
   a ceramic vane adjacent the blade, the ceramic vane having a tip;
   a seal carried on the rotor adjacent the tip of the ceramic vane; and
   a cooling passage circuit extending through the blade, the seal, and the ceramic vane, the cooling passage circuit configured to provide cooling air into the blade, then from the blade into the seal, and then from the seal into the ceramic vane, wherein the blade includes a compliant passage seal sealing a supply passage into the blade from a return passage that connects the supply passage with the seal.

2. The gas turbine engine as recited in claim 1, wherein the cooling passage circuit includes a circuit leg in the seal, the circuit leg including an axial passage connected to receive cooling air from the blade, and a radial feed passage connecting the axial passage with the ceramic vane.

3. The gas turbine engine as recited in claim 1, wherein the seal is formed of ceramic.

4. The gas turbine engine as recited in claim 3, wherein the rotor includes a disk and an axial support arm projecting from the disk and supporting the seal.

5. The gas turbine engine as recited in claim 3, wherein the rotor includes a disk supporting the seal.

6. The gas turbine engine as recited in claim 1, wherein the cooling passage circuit includes a radial inlet in the tip of the ceramic vane and a radial outlet in the seal which is in register with the radial inlet, the tip of the ceramic vane has forward and aft vane seal elements, the radial inlet is axially between the forward and aft vane seal elements, the seal has forward and aft mating seal elements, and the radial outlet is axially between the forward and aft mating seal elements.

7. The gas turbine engine as recited in claim 1, wherein the cooling passage circuit includes a circuit leg in the blade, the circuit leg includes an inlet, an axially-extending manifold passage, one or more radially-extending supply passages, and one or more return passages connecting the one or more radially-extending supply passages to an inlet and an axial passage in the seal.

8. The gas turbine engine as recited in claim 7, where the compliant passage seal is disposed in the axially-extending manifold passage.

9. The gas turbine engine as recited in claim 7, wherein the compliant passage seal is disposed in a rib that projects radially inwardly from a root of the blade.

10. A gas turbine engine comprising:
    a forward stage including a row of forward vanes followed by a row of forward blades;
    an aft stage including a row of aft ceramic vanes followed by a row of aft blades, the aft ceramic vanes having respective tips;
    seals adjacent the tips of the aft ceramic vanes; and
    a cooling passage circuit extending through the forward blades, the seals, and the aft ceramic vanes, the cooling passage circuit including radial inlets in the tips of the aft ceramic vanes and radial outlets in the seals which are in register with the radial inlets, the tips of the aft ceramic vanes having forward and aft vane seal elements, the radial inlets being axially between the forward and aft vane seal elements, the seals having forward and aft mating seal elements, and the radial outlets being axially between the forward and aft mating seal elements.

11. The gas turbine engine as recited in claim 10, wherein the forward stage is a first turbine stage and the aft stage is a second turbine stage.

12. The gas turbine engine as recited in claim 10, further comprising a cooling air source radially inwards of the forward blades.

13. The gas turbine engine as recited in claim 10, wherein the cooling passage circuit is configured to provide cooling air into the forward blades, then from the forward blades into the seals, and then from the seals into the aft ceramic vanes.

14. The gas turbine engine as recited in claim 13, wherein the cooling passage circuit includes a circuit leg in the forward blades, the circuit leg including supply passages into the forward blades and return passages connecting the supply passages with the seals.

15. The gas turbine engine as recited in claim 13, wherein the cooling passage circuit includes a circuit leg in the seals, the circuit leg including axial passages connected to receive cooling air from the forward blades, and radial feed passages connecting the axial passages with the aft ceramic vanes.

16. The gas turbine engine as recited in claim 13, wherein the cooling passage circuit includes first and second circuit legs, the first circuit leg being in the forward blades and including supply passages into the forward blades and return passages connecting the supply passages with the seals, and the second circuit leg being in the seals and including axial passages connected to receive cooling air from the return passages, and radial feed passages connecting the axial passages with the aft ceramic vanes.

17. The gas turbine engine as recited in claim 10, wherein the seals are formed of ceramic.

18. The gas turbine engine as recited in claim 10, wherein each of the forward blades includes a compliant passage seal that seals a supply passage of the cooling passage circuit into each forward blade from a return passage of the cooling passage circuit that connects the supply passage with the compliant passage seal.

* * * * *